United States Patent Office 3,445,479
Patented May 20, 1969

3,445,479
N-ACYLATED-5-IODOINDOLES
Allan E. Hydorn, Milltown, N.J., assignor to E. R. Squibb
 & Sons, Inc., New York, N.Y., a corporation of
 Delaware
No Drawing. Filed Dec. 9, 1966, Ser. No. 600,069
Int. Cl. C07d 27/56
U.S. Cl. 260—326.16
2 Claims

ABSTRACT OF THE DISCLOSURE

Intermediates in the synthesis of 5-iodoindole having the formula

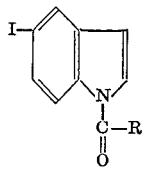

wherein R is lower alkyl. 5-iodoindole is an intermediate in the preparation of 5-iodo-DL-tryptophan, a diagnostic tool employed in radioactive iodine studies and in the preparation of anthranilic acids which are useful as dyes and flavorings.

---

This invention relates to the synthesis of 5-iodoindole, and has for its object the provision of new intermediates in that synthesis. More particularly, this invention has for its object the provision of novel intermediates having the formula

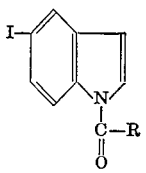

wherein R is lower alkyl.

5-iodoindole is a valuable intermediate in the preparation of 5-iodo-DL-tryptophan, a synthetic amino acid which is valuable as a diagnostic tool employed in radioactive iodine studies. 5-iodoindole is also a valuable intermediate in the preparation of anthranilic acids which are well known for their use, for instance, as dyes and flavorings.

In accordance with this invention 5-iodoindole is prepared according to the following reaction scheme. The continuation of the process to obtain 5-iodo-DL-tryptophan is also shown.

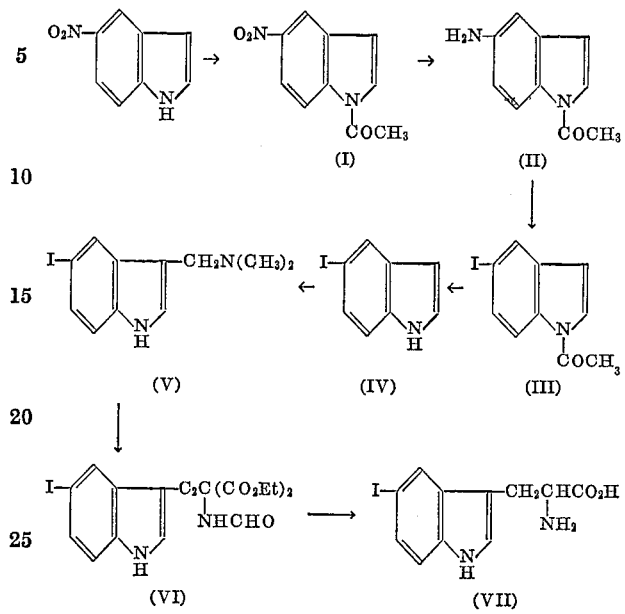

In the first step of the above scheme, 5-nitroindole is reacted with an acylating agent such as acetic anhydride, acetyl chloride or other lower alkyl acid, anhydride or acid chloride in the presence of an inorganic salt of the acid such as potassium or sodium acetate to give an N-acylated 5-nitroindole, such as N-acetyl-5-nitroindole (Compound I). Lower alkyl acids, anhydrides or acid chlorides which may be employed above include such compounds as propionic acid, butyric anhydride, caproyl chloride, and the like.

The N-acetyl-5-nitroindole so obtained is hydrogenated in the presence of a suitable solvent and a hydrogenation catalyst such as palladium on barium sulfate, palladium on carbon, or palladium on calcium carbonate to obtain N-acetyl-5-aminoindole (Compound II).

The N-acetyl-5-aminoindole is then diazotized by dissolving it in an aqueous solution of a concentrated acid, such as hydrochloric or sulfuric acids, and treating this mixture with an aqueous solution of sodium or potassium nitrite to form the diazonium salt. This salt is then reacted with potassium iodide to produce N-acetyl-5-iodoindole (Compound III).

The N-acetyl-5-iodoindole is converted to 5-iodoindole by hydrolysis in a caustic solution for the required length of time.

Condensation of the 5-iodoindole with dimethylamine and formaldehyde in acetic acid yields 5-iodogramine (Compound V).

The 5-iodogramine is condensed with diethyl formamidomalonate in the presence of sodium hydroxide and a solvent such as toluene under gentle reflux conditions to produce diethyl α-formamido-α-(5-iodo-3-indolylmethyl)malonate (Compound VI).

Compound VI is hydrolyzed by refluxing in the presence of ethanol and sodium hydroxide and then decarboxylated by refluxing in glacial acetic acid to form the final product 5-iodo-DL-tryptophan (Compound VII).

The preparation of Compounds IV, V, VI and VII is additionally disclosed in the article by D. G. Harvey in the Journal of the Chemical Society, 3760 (1958).

The production of 5-iodo-DL-tryptophan to be employed in radioactive iodine studies is accomplished by the introduction of radioactive iodine, such as I-125, I-129 or I-131 during the diazonium reaction to form labeled N-acetyl-5-iodoindole.

The preparation of anthranilic acids from 5-iodoindole is described in Chemische Berichte, 95:2205 (1962).

The following examples serve to illustrate the invention.

EXAMPLE 1

*N-acetyl-5-nitroindole*

(a) A mixture of 50 g. (0.31 mole) of 5-nitroindole, 40 g. of potassium acetate, and 300 ml. of acetic anhydride is heated under nitrogen for 2 hours at 95° C. After cooling to 5° C., the mixture is filtered, the cake washed with 30 ml. of acetic anhydride, and reslurried in 200 ml. of water at 55° C. for 5 minutes. Filtration and drying at 55° C. for 20 hours gives 53.6 g. (85 mole percent) of yellow solid, M.P. 176–178° C. Recrystallization from 20 volumes of refluxing acetone gives the analytical sample, M.P. 178–180° C.

$\lambda_{max.}^{Nujol}$ 5.85$\mu$; $\lambda_{max.}^{Alc.}$ 297 m$\mu$ ($E_{1\ cm.}^{1\%}$ 442), 275 m$\mu$ ($E_{1\ cm.}^{1\%}$ 625), 263 m$\mu$ ($E_{1\ cm.}^{1\%}$ 1141), 254 m$\mu$ ($E_{1\ cm.}^{1\%}$ 1126)

*Analysis.*—Calc'd for $C_{10}H_8N_2O_3$(204): C, 58.8; H, 3.94; N, 13.7. Found: C, 60.0; H, 4.21; N, 13.5.

(b) Following the same procedure, but substituting equivalent amounts of potassium butyrate and butyric anhydride for the potassium acetate and acetic anhydride, N-butyryl-5-nitroindole is obtained.

(c) In like manner, substituting equivalent amounts of potassium caproate and caproic anhydride, there is obtained N-caproyl-5-nitroindole.

EXAMPLE 2

*N-acetyl-5-aminoindole*

(a) A mixture of 55 g. (0.27 mole) of N-acetyl-5-nitroindole, 5.5 g. of 5% palladium on barium sulfate catalyst, and 1400 ml. of absolute ethanol is hydrogenated at 10 p.s.i.g. for one hour. The mixture is filtered, and the catalyst cake washed with 50 ml. of absolute ethanol. Concentration of the ethanol solution to about 200 ml. and cooling gives 42 g. (89 mole percent of solid, M.P. 126–128° C. Purification by silica gel chromatography gives the analytical sample, M.P. 115–117° C.

$\lambda_{max.}^{Nujol}$ 2.93, 3.0, 5.94$\mu$; $\lambda_{max.}^{Alc.}$ 259 m$\mu$ ($E_{1\ cm.}^{1\%}$ 1150)

*Analysis.*—Calc'd. for $C_{10}H_{10}N_2O$(174): C, 69.0; H, 5.79; N, 16.1. Found: C, 68.8; H, 5.89; N, 16.0.

(b) Substituting an equivalent amount of N-butyryl-5-nitroindole for the N-acetyl-5-nitroindole above, there is obtained N-butyryl-5-aminoindole.

(c) Likewise the substitution of an equivalent amount of N-caproyl-5-nitroindole for the N-acetyl-5-nitroindole, results in the production of N-caproyl-5-aminoindole.

EXAMPLE 3

*N-acetyl-5-iodoindole*

A mixture of 42 g. (0.24 mole) of N-acetyl-5-aminoindole, 62.4 ml. of concentrated hydrochloric acid, and 124.8 ml. of water at −5° C. is treated dropwise with a solution of 17.4 g. of sodium nitrite in 36 ml. of water to a positive starch-iodide test. Then a solution of 42 g. of potassium iodide in 42 ml. of water is added at −5° C., after which the mixture is allowed to warm slowly to room temperature. The orange mixture is heated to 40° C., treated with 500 ml. of water and 500 ml. of chloroform and the phases allowed to separate. The chloroform phase is washed with 500 ml. each of water, 5% sodium bisulfite, 0.1 N hydrochloric acid, 5% sodium bicarbonate, and water in the order given. Concentration of the chloroform solution gives a 50 g. residue. This is taken up in 150 ml. of benzene and diluted with 150 ml. of hexane to separate a tar. Further dilution with 300 ml. of hexane effects complete tar removal. Concentration of the hexane solution then gives 39 g. (57 mole percent) of solid, M.P. 80–84° C. Recrystallization from acetone, followed by crystallization from absolute ethanol gives the analytical sample, M.P. 106–107° C.

$\lambda_{max.}^{Nujol}$ 5.87$\mu$; $\lambda_{max.}^{Alc.}$ 246 m$\mu$ (E $_{1\ cm.}^{1\%}$ 1057)

*Analysis.*—Calc'd for $C_{10}H_8INO$(285): C, 42.2; H, 2.83; N, 4.92. Found: C, 42.5; H, 3.00; N, 4.58.

(b) By substituting an equivalent amount of N-butyryl-5-aminoindole for the N-acetyl-5-aminoindole above, there is obtained N-butyryl-5-iodoindole.

(c) In like manner the substitution of an equivalent amount of N-caproyl-5-aminoindole results in the production of N-caproyl-5-iodoindole.

EXAMPLE 4

*5-iodoindole*

(a) A solution of 39 g. (0.137 mole) of N-acetyl-5-iodoindole in 400 ml. of Claisen's caustic (prepared by diluting a solution of 141 g. potassium hydroxide in 101 ml. of water to 400 ml. with methanol) is heated at 75–80° C. for 30 minutes. After cooling, the solution is diluted with 1000 ml. of water and extracted with 1000 ml. and 200 ml. portions of benzene. The combined benzene extracts are washed 500 ml. each of water, 1% sodium bisulfite, 5% sodium bicarbonate, and water in the order given. The benzene solution is concentrated to about 40 ml., then diluted with about 320 ml. of hexane to effect separation of an oil. Decantation of the hexane solution from the oil and concentrating gives 16 g. (48 mole percent) of gray solid, M.P. 99–102° C.

$\lambda_{max.}^{Nujol}$ 2.93, 6.40$\mu$; $\lambda_{max.}^{Alc.}$ 230 m$\mu$ ($E_{1\ cm.}^{1\%}$ 1813), 226 m$\mu$ ($E_{1\ cm.}^{1\%}$ 1905)

*Analysis.*—Calc'd for $C_8H_6IN$(243): C, 39.5; H, 2.49; I, 52.3; N, 5.77. Found: C, 39.4; H, 2.74; I, 51.8; N, 5.70.

(b) The same result is achieved by following the procedure of (a), substituting an equivalent amount of either N-butyryl-5-iodoindole or N-caproyl-5-iodoindole.

EXAMPLE 5

*5-iodogramine*

A solution of 10 g. (0.041 mole) of 5-iodoindole in 30 ml. of glacial acetic acid is treated dropwise with a solution of 5.6 g. 40% aqueous dimethylamine and 4.0 g. 37% formaldehyde in 10 ml. of glacial acetic acid. The mixture is stirred at about 30° C. for 6 hours, then filtered. The filtrate is neutralized with about 400 ml. of 2.5 N sodium hydroxide. After chilling, the solid which had separated is filtered and dried to give 6.4 g. (50 mole percent) of solid, M.P. 167–170° C. Recrystallization by neutralization of an acid solution gives the analytical sample, M.P. 171–174° C.

$\lambda_{max.}^{Alc.}$ 229 m$\mu$ ($E_{1\ cm.}^{1\%}$ 1436)

*Analysis.*—Calc'd for $C_{11}H_{13}IN_2$(300): I, 42.40. Found. I, 42.2.

EXAMPLE 6

*Diethyl α-formamido-α-(5-iodo-3-indolylmethyl) malonate*

A mixture of 12 g. (0.04 mole) of 5-iodogramine, 11 g. of diethyl formamidomalonate, 1.5 g. powdered sodium hydroxide, and 37 ml. of dry toluene is refluxed gently for 40 minutes. The cooled solution is diluted with 120 ml. of hexane to precipitate the crude product. The solid is mixed with 100 ml. of water and 100 ml. of ether, and the ether layer separated and washed with 250 ml. of water. Concentration gives 15.2 g. of crude product.

Crystallization from methanol gives 8.6 g. (47 mole percent) of solid, M.P. 130–133° C.

$\lambda_{max.}^{Nujol}$ 3.05, 5.77, 6.02μ

Analysis.—Calc'd for $C_{17}H_{19}IN_2O_5$(458): C, 44.5; H, 4.15; I, 27.8. Found: C, 43.8; H, 4.82; I, 29.0.

EXAMPLE 7

*5-iodo-DL-tryptophan*

A mixture of 7.0 g. (0.015 mole) of diethyl α-formamido-α-(5-iodo-3-indolylmethyl)malonate in 14 ml. of ethanol and 56 ml. of 2.5 N sodium hydroxide is refluxed for 30 minutes. The ethanol is removed by distillation over 30 minutes, and the resulting solution refluxed at about 105° C. for 5 hours. To the refluxing solution is then added 7 ml. of glacial acetic acid, and reflux continued for another one hour. On chilling, the solid that separated is filtered and recrystallized from a solution of 60 ml. of water and 6 ml. of glacial acetic acid to give 4.1 g. (81 mole percent) of solid, M.P. 265–267° C.

$\lambda_{max.}^{Nujol}$ 3.07, 5.93, 6.08, 6.30μ

Analysis.—Calc'd for $C_{11}H_{11}IN_2O_2$(330): C, 40.0; H, 3.34; I, 38.5. Found: C, 39.7; H, 3.58; I, 36.9.

What is claimed is:
1. A compound having the formula

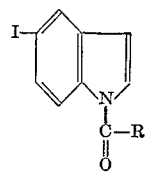

wherein R is lower alkyl.
2. A compound in accordance with claim 1 having the name N-acetyl-5-iodoindole.

References Cited

Noland et al., J. Org. Chem., vol. 28; 2262–2266 (1963).
Noland et al., J. Org. Chem. vol. 31, 70–77 (1966).
Morrison et al., Organic Chemistry (1959), p. 572.
Terent'ev et al., Chem. Abs., vol. 52, 11003–04 (1958).

ALEX MAZEL, *Primary Examiner.*

J. A. NARCAVAGE, *Assistant Examiner.*

U.S. Cl. X.R.

260—326.14, 326.15, 518